United States Patent [19]

Riesco

[11] Patent Number: 4,672,521
[45] Date of Patent: Jun. 9, 1987

[54] POWER CONVERTER FOR SYNTHESIZING A WAVE FORM

[75] Inventor: Luis A. Riesco, Wall, N.J.

[73] Assignee: Allied Corporation, Morris Township, Morris County, N.J.

[21] Appl. No.: 685,015

[22] Filed: Dec. 21, 1984

[51] Int. Cl.⁴ .............................................. H02M 1/12
[52] U.S. Cl. ...................................... 363/41; 363/97; 363/134
[58] Field of Search ............... 307/359, 553; 323/271, 323/284; 330/10, 207 A, 251; 363/41, 97, 134

[56] References Cited

U.S. PATENT DOCUMENTS

| | | | |
|---|---|---|---|
| 3,294,981 | 12/1966 | Bose | 307/553 |
| 3,449,689 | 6/1969 | Harley | 330/251 |
| 3,636,430 | 1/1972 | Kernick et al. | 363/41 |
| 3,697,855 | 10/1972 | Kernick et al. | 363/41 |
| 3,710,229 | 1/1973 | Jessee | 363/41 |
| 3,781,634 | 12/1973 | Jessee | 363/41 |
| 4,035,715 | 7/1977 | Wyman et al. | 323/268 |
| 4,270,164 | 5/1981 | Wyman et al. | 363/56 |
| 4,306,182 | 12/1981 | Curtiss | 318/811 |
| 4,387,421 | 6/1983 | Zach et al. | 363/41 |
| 4,424,557 | 1/1984 | Steigerwald | 363/41 |
| 4,456,872 | 6/1984 | Froeschle | 363/21 |
| 4,456,950 | 6/1984 | Cordy, Jr. | 363/26 |
| 4,467,262 | 8/1984 | Curtiss | 318/811 |
| 4,489,371 | 12/1984 | Kernick | 363/41 |
| 4,495,557 | 1/1985 | Weit | 363/89 |

Primary Examiner—Patrick R. Salce
Assistant Examiner—Jeffrey Sterrett
Attorney, Agent, or Firm—Howard G. Massung; Stanley N. Protigal

[57] ABSTRACT

A power converter (10) for supplying an output wave shape as a function of an oscillator (22) input utilizing a power output switching stage. A band limit generator (24) provides two reference signals (HL, LL) which define a band. The two reference signals are compared with a feedback signal from the load, in a detector (26). The detector (26) provides output signals for controlling the switching power output stage (20) to bring the feedback signal within the defined band.

6 Claims, 8 Drawing Figures

POWER CONVERTER FOR SYNTHESIZING A WAVE FORM

BACKGROUND OF THE INVENTION

1. Field of the Invention

This invention relates to a power converter and more particularly to a power supply which is particularly suitable for use on an aircraft or other vehicle for providing an output of a desired frequency.

2. Description of the Prior Art

Variable speed, constant frequency, power converters are presently in use in many aircrafts. Conventional mechanical to electrical energy conversion as used on most aircraft, ships and vehicles have many limitations such as efficiency, reliability, downtime, maintenance costs and electrical quality. In a prior art variable speed constant frequency generating system a direct drive variable speed generator provides a variable frequency AC output. Thru a static converter package the output from the generator is rectified by a full wave bridge and then filtered to obtain clean DC. The DC is used to power four three phase full wave transistor bridges which are switched on and off to produce precisely timed square waves. Each bridge output is connected to one of four three phase primaries wound onto a single three phase transformer. Two of the primaries are wound in a wye configuration and two are wound in a delta configuration. The magnetic summation of the four bridges produces in the secondary a twenty-four step sinusoidal waveform. The secondary is connected in a wye configuration and produces a single three phase output. The stepped waveform from the secondary windings is then filtered to obtain a clean sine wave. The logic for switching on and off the full wave bridges is digitally derived and based on a stable oscillator to insure an accurate output. Although this DC link approach provides a satisfactory AC output the static converter output package is relatively heavy and the generator system output is restricted to a fixed frequency. The output transformer and filters add significantly to the converter weight.

Electrical devices with switching type output sections, for switching between DC voltages, are known in the art. U.S. Pat. Nos. 3,294,981; 3,351,871; and 4,270,164 are exemplary of these switching type devices.

SUMMARY OF THE INVENTION

A power converter is provided wherein a reference band, related to a desired output, is generated for comparison with a feedback signal to control a switching power output stage to maintain the power supply output at the desired frequency. The reference band is defined by high and low limit signals.

A reference oscillator provides a signal having the desired wave shape and frequency as the desired current output of the power converter. The reference oscillator feeds a band limit generator which provides the two output reference signals to define the band. The output signals are fed to a detector which also receives a feedback signal from the load. The feedback signal is compared with the upper and lower band limit signals and the power output stage is switched to bring the feedback signal within the defined band.

The power output stage has power connections to a positive bus and a negative bus. Appropriate switching transistors are provided for connecting the positive bus voltage or the negative bus voltage to the load. Upper and lower driver circuits are provided for activating the switching output transistors. Turn on detectors are provided for controlling the switching transistor to prevent simultaneous conduction and resulting current shoot through which would damage circuit components. Isolator circuits are provided between the detector and the upper driver stage and the lower driver stage.

Similar power converter circuits can be provided for a three phase output. For a three phase power supply the reference signal is provided for one phase to a detector as explained above. The reference signal is phase shifted 120° and 240° to provide reference signals for the other two phases. The reference signal for the other two phases are fed to detectors and the related isolator, driver and output circuits operate as described above.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENT

Figure 1:
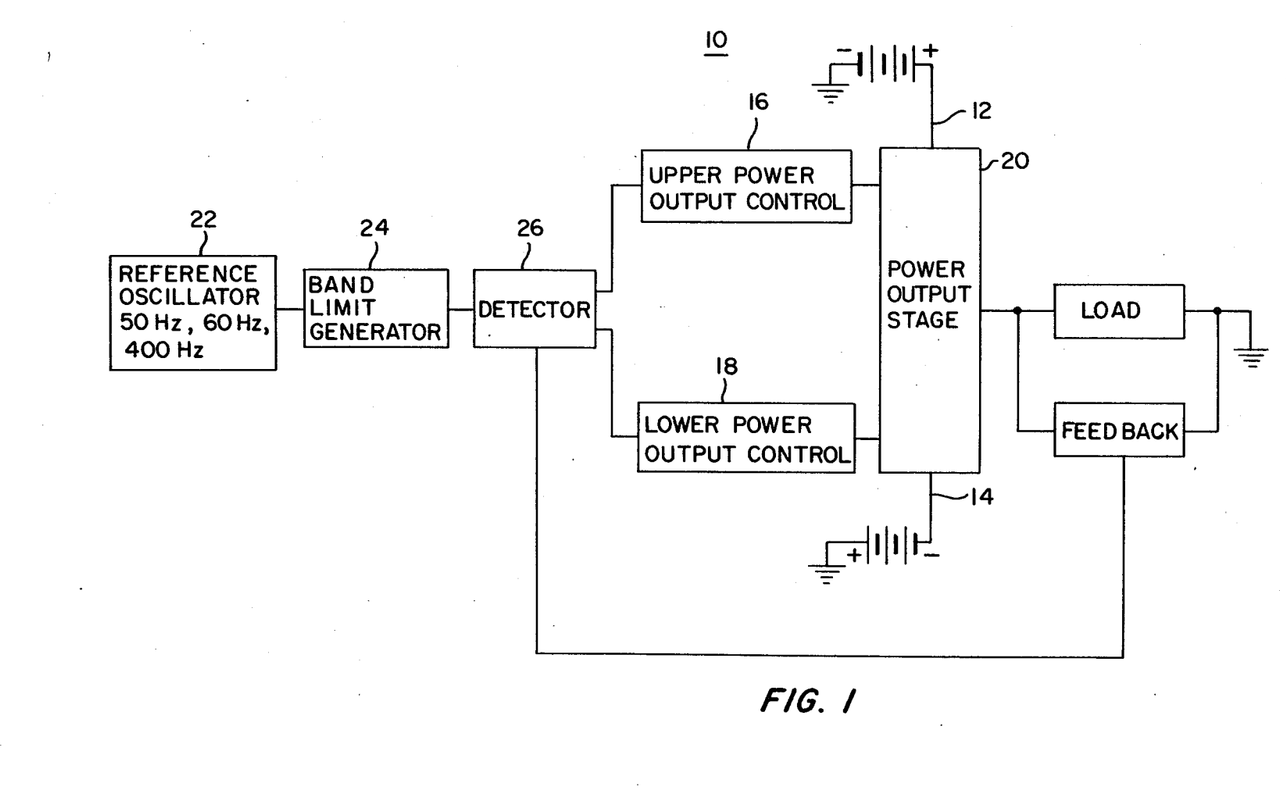
FIG. 1 is a block diagram of a power converter utilizing the teaching of the present invention.
Figure 8:
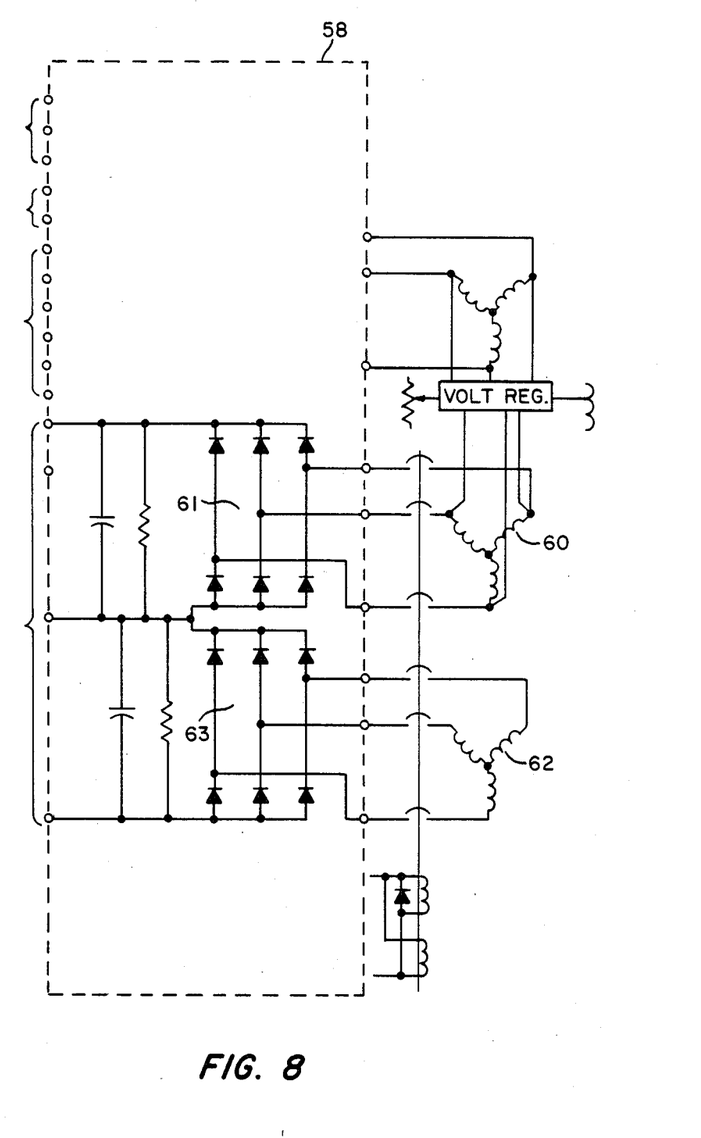
FIG. 8 shows the power input circuit from the generator for supplying the positive DC bus and the negative DC bus.

Referring now to the drawings and FIG. 1 in particular there is shown a power converter 10 utilizing the teaching of the present invention. Power converter 10 includes a power output stage 20 which connects a positive DC bus 12 or a negative DC bus 14 to a load in response to control signals from an upper power output control 16 or a lower power output control 18. Power for the negative DC bus 14 and the positive DC bus 12 is from the rectified output of a direct drive variable speed generator. As shown in FIG. 8 the AC gutput of the generator is converted to DC by full wave bridge circuits.

Figure 3:
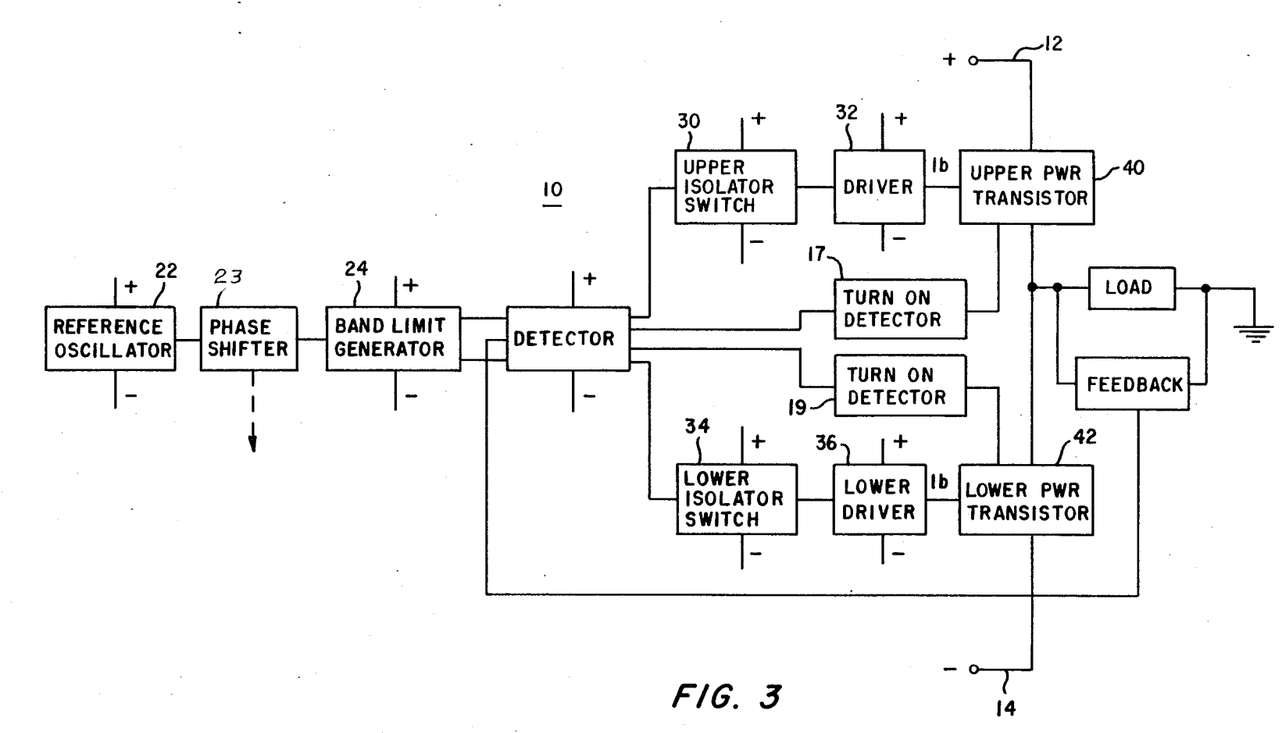
FIG. 3 is a block diagram, similar to FIG. 1, of a power converter utilizing the teaching of the present invention.
Figure 5:
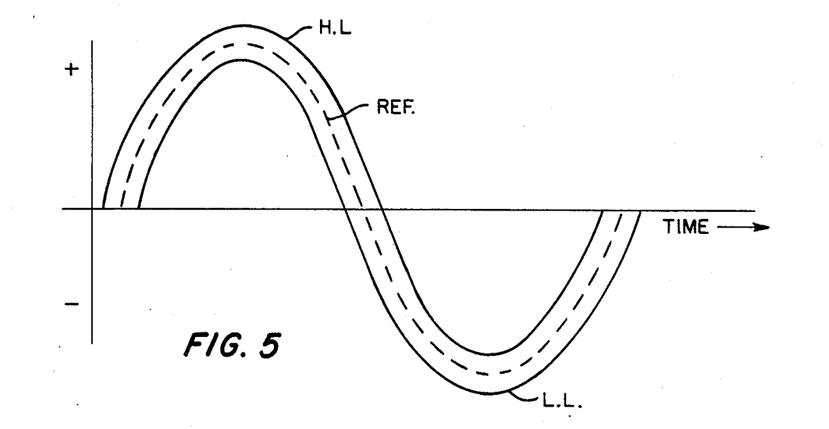
FIG. 5 shows the upper limit and lower limit wave forms produced by the band generator of FIG. 4.

In the converter of FIG. 1, a reference oscillator 22 provides a reference signal having the desired frequency and wave shape for the output current supplied to the load. Reference oscillator 22 can provide sine waves having commonly used frequencies such as 50 Hz, 60 Hz, or 400 Hz. Reference oscillator 22 feeds band limit generator 24 which provides reference signals HL and LL as shown in FIG. 5, to define a band. The output of the band limit generator 24 is fed to a detector 26 and compared with a feedback signal from the load to provide inputs to the upper power output control 16 and lower power output control 18. The output signal from detector 26 causes the power output stage 20 to switch and bring the output current and feedback signal within the defined band. Turn on detectors 17 and 19, shown in FIG. 3, are provided for determining which DC bus is connected to the load and preventing connection of the opposite bus. Detectors 17 and 19 prevent simultaneous connection of opposite DC buses to the load, which could cause destructive current flow.

Figure 2:
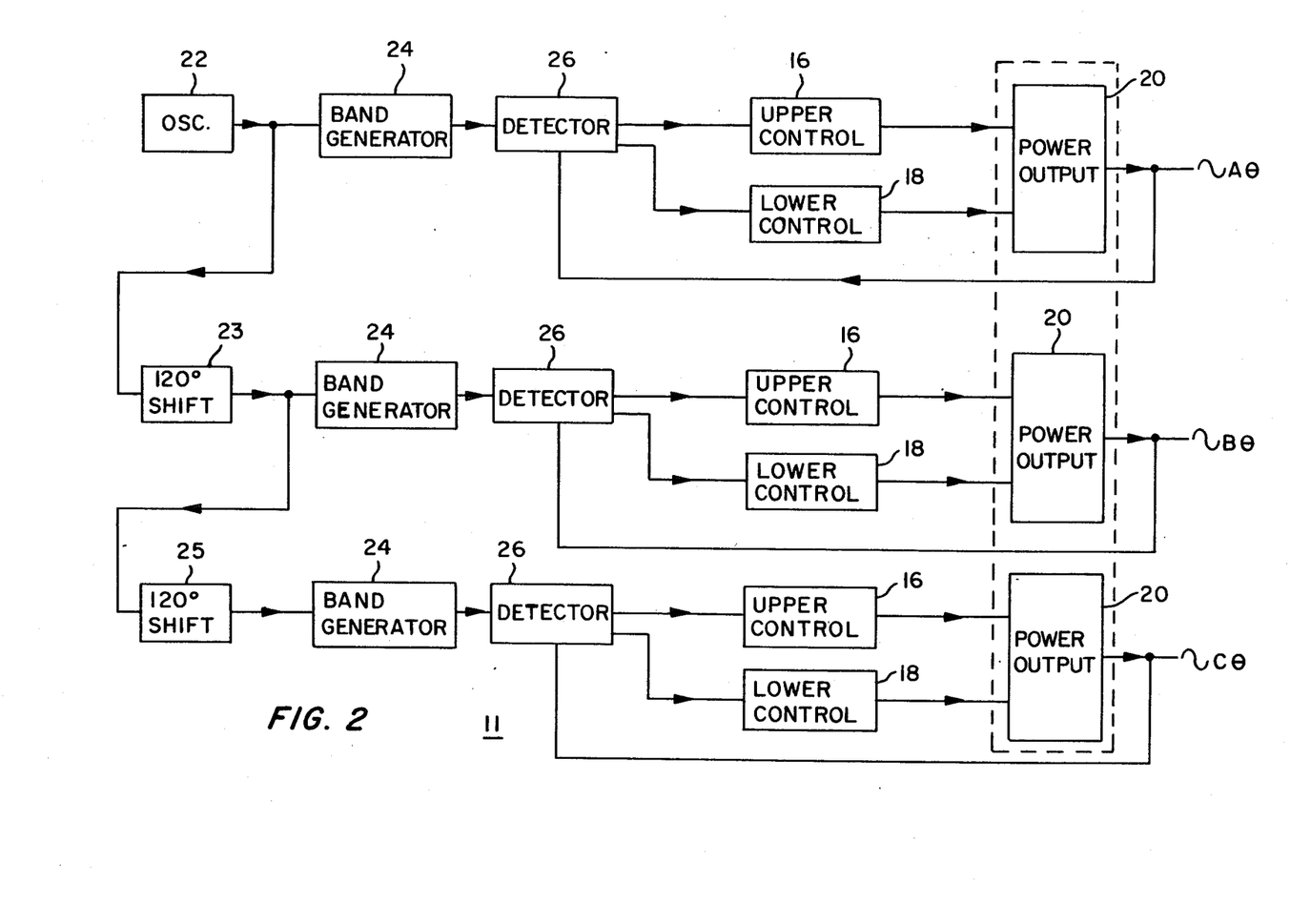
FIG. 2 is a block diagram of a power converter according to the present invention for a three phase output.

Referring now to FIG. 2 there is shown a simplified block diagram for a three phase power converter 11. The circuit, from the band generator 24 to the load for each phase functions similar to the circuit described in FIG. 1. The output signal from the reference oscillator 22 is provided with the necessary phase shift so that the output of each power output stage 20 has the proper phase relationship. The output of oscillator 22 provided the input to band generator 24 for A phase. Phase shifter 23 provides a 120° phase shift for the output of oscillator 22 and this is used as the reference signal to band generator 24 for B phase. A second phase shifter 25 provides a 120° phase shift for the output of phase shifter 23 and this is used as the reference signal to band generator 24 for C phase.

As can be seen in FIG. 3, the upper power output control 16 is formed from an upper isolator 30 and upper driver 32, and the lower power output control 18 is formed from a lower isolator 34 and a lower driver 36. The power output stage 20 consists of an upper power transistor switch 40 and a lower power transistor 42. These power output transistors switches 40, 42 are switched on by appropriate signals from their associated drivers 32 and 36 to connect the positive DC bus 12 or the negative DC bus 14 to the load. The control for power supply 10 is capable of turning on demand either of the two power transistors switches 40, 42 to generate the desired wave shape.

Figure 4:
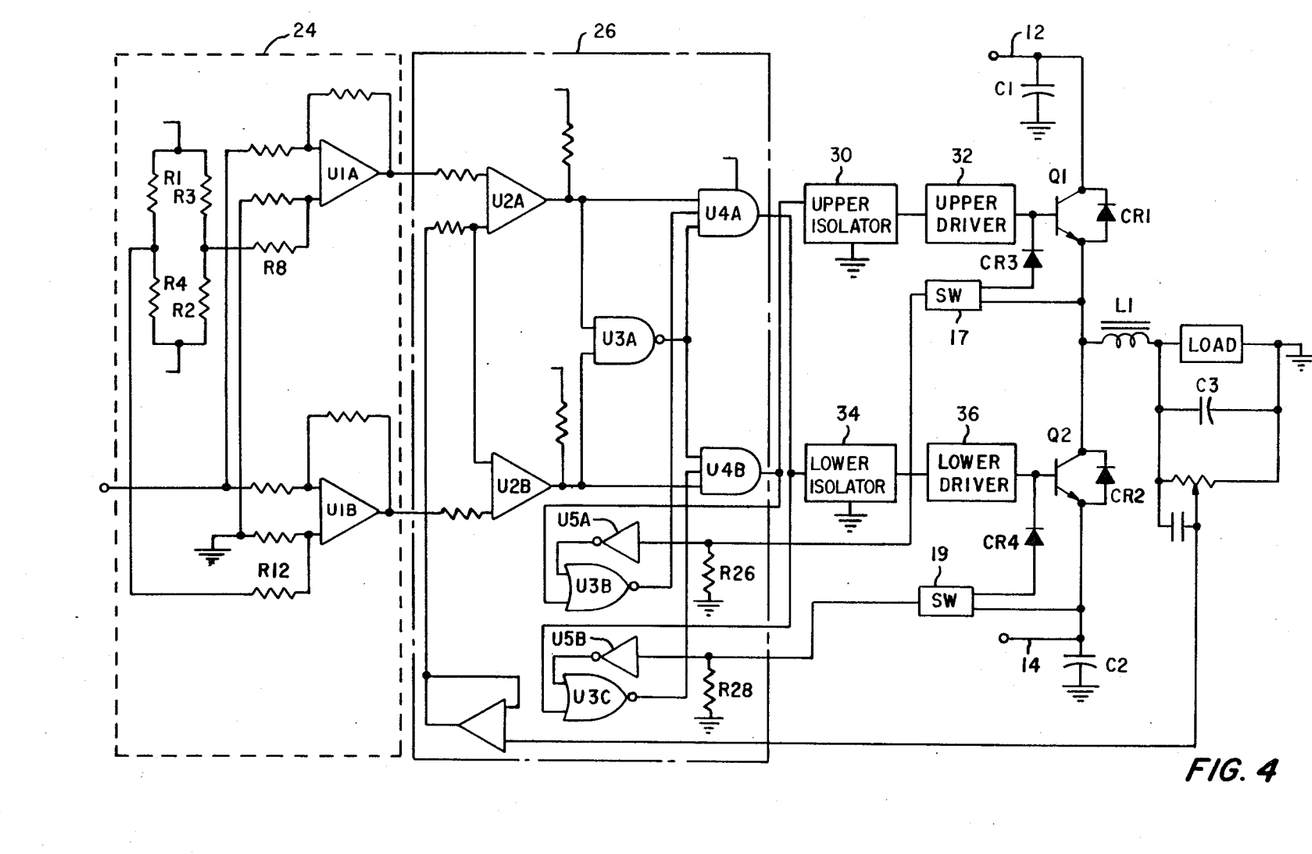
FIG. 4 is a schematic of a portion of the power converter of FIG. 1 showing the band generator and detector in more detail.

Band limit generator 24 and detector 26 are shown in more detail in FIG. 4. Band limit generator 24 produces a sine wave reference with a higher and lower band limit which is fed into detector 26. The band limit generator 24 develops from the output of oscillator 22 a high limit HL signal and a low limit LL signal which define a reference band as shown in FIG. 5. Detector 26 also receives a feedback signal which is derived from the output load voltage. This feedback signal is compared to the reference band in the detector 26 which then produces pulses, through the isolator switches 30, 34 and drivers 32, 36 to turn on either the upper power transistor switch 40 or the lower power transistor switch 42 as required. Upper power transistor switch 40 consists of a power transistor Q1 and a parallel fly wheel diode CR1, while lower power transistor switch 42 consists of a power transistor Q2 and a parallel fly wheel diode CR2.

If the feedback signal is within the reference band defined by the upper and lower signal outputs from band limit generator 24 then both power output transistors Q1, Q2 are turned off and the output voltage is maintained by capacitor C3. When transistor Q1 is turned off, the inductive energy stored in inductor L1 discharges into the load through the fly wheel diode CR2 and capacitor C2 thus maintaining current flow in the same direction. Similarly when transistor Q2 is turned off the inductive energy stored in inductor L1 discharges through diode CR1 and capacitor C1.

Any deviation of the feedback signal from the reference band set by the upper limit HL and lower limit LL reference signals results in a corrective action at the output of detector 26. Corrective action from detector 26 to the power stage 20 can occur at any portion of the wave shape and thus the response of the power converter 10 circuit is very fast.

The bridge formed from resistors R1, R2, R3 and R4 set voltages of positive and negative values and with limiting resistors R8 and R12 bias the reference non-inverting inputs of differential amplifiers or comparators U1A and U1B. The waveshape, amplitude and frequency of the oscillator input signal is reproduced as a high limit HL signal and low limit siginal LL defining a band of exactly the same characteristics, which is the wave output of power supply 10. If the output of the power converter 10 is low, below limit LL, at some point of the positive half cycle the inverting input of comparator U2B will turn high the output of the comparator U2B. The high output of U2B across U4B will turn on the upper isolator switch 30 and thru upper driver 32 turn on power transistor Q1. Turning on power transistor Q1 draws current from the positive bus 12 through the load bringing the output load voltage within the defined band. Then the power transistor Q1 is turned off and the reactive energy stored in inductor L1 is discharged and circulated across the load, negative bus capacitor C2 and flywheel diode CR2, supplying positive, but decreasing, current to the load.

If the output of power converter 10 is high, above HL, during the negative half cycle, the noninverting input of comparator U2A will turn high the output of U2A. The high signal at gate U4A will turn on the lower isolator switch 34 and the lower driver 36 driving on power transistor Q2, which connects negative bus 14 to the load bringing the load voltage drop down. Once the voltage across the load is within the defined band, power transistor Q2 is turned off and the reactive energy is discharged into the load through the positive bus 12, capacitor C1 and the flywheel diode CR1.

NAND gate U3A senses the outputs of comparators U2A and U2B in detector 26 and will prevent giving a high required for the turn on of the power transistors Q1, Q2 if the outputs of U2A and U2B are simultaneously high. This circuit with U3A insures the output of either U2A or U2B must be low before the other is high and works as a safety interlock at the logic level.

Turn on detectors 17, 19 are connected to each of the bipolar output power transistors Q1, Q2 to sense when these transistors Q1, Q2 are fully off. Detector 17 or 19 is energized each time the base of its associated transistor Q1 or Q2 is reversed biased and the power transistor Q1 or Q2 completes conduction. When Q1 is to complete conduction a negative voltage from upper driver 32 is applied directly to the base of Q1 and the cathode of a diode CR3 which is connected to an input of detector 17. Meanwhile as the collector current keeps circulating there is only the voltage diode drop across the base emitter of Q1 which is not high enough to activate detector 17. When transistor Q1 completes conduction the voltage across the base emitter junction rises to a level high enough to activate detector switch 17. Detector 17 includes an isolated output transistor which turns on when the base emitter voltage on Q1 is high and circulates current through resistor R26. This makes high an input to inverter U5A and a low to NOR gate U3B. The other input to NOR gate U3B senses the output of AND gate U4B which controls the upper driver 32. Only when power transistor Q1 completes collector conduction and puts a low into NOR gate U3B can transistor Q2 be turned on. When the output of U4B is low the base of Q1 has been driven off and when detector 17 is activated, indicating Q1 has ceased conduction, then the output of NOR gate U3B is high enabling U4A to turn on. Even if detector 26 wants to turn on transistor Q2 by generating a high input to gate U4A, the turn on detector 17 prevents this until Q1 completes conduction.

Turn on detector 19 functions similarly with respect to transistor Q2. Detector 19 senses the voltage across the base emitter junctions of transistor Q2 and prevents Q1 from being turned on until Q2 is fully off. Nor gate U3C senses the output of U4A, which provides the signal for turning on transistor Q2, and the output of on detector 19, which directly senses when transistor Q2 is not conducting. When transistor Q2 is not conducting detector 19 is activated and through inverter U5B provides a low input to NOR gate U3C. When the output of U4A is low and Q2 is not conducting then gate U3C provides an enable signal allowing gate U4B to turn on.

Diodes CR3 and CR4 block current to detectors 17 and 19 during base turn on from drivers 32, 36. These diodes CR3, CR4 are activated only during negative drive periods after conduction of collector current is complete.

During operation detector circuit 26 senses any deviation from the defined band and turns off both power transistors Q1, Q2 if the output voltage across the load, is within the band. The band width provides the idling time to allow the active power transistor to turn off before the other power transistor is turned on.

If the load generates reactive energy the feedback voltage will tend to lead the reference band. The detector will see this condition, depending on time, as a high signal, driving on transistor Q2. Driving on transistor Q2 brings the power converter output within band and the energy flows from the load through Q2 into the power bus capacitor C2. As soon as the voltage output is within the band transistor Q2 is turned off. The cycle is repeated for the portion of the wave, as long as the condition remains. Next the detector 26 will see the condition as a low driving transistor Q1 on to bring the load voltage within band. The energy flows from capacitor C1 into transistor Q1 toward the load, aiding the voltage output to rise to the proper output value. This operation is repeated as the described conditions are sensed by the detector 26.

If the load generates capacitive energy, the feedback voltage will tend to lag the reference voltage, and the detector compensation will take place in a reverse mode.

Figure 6:
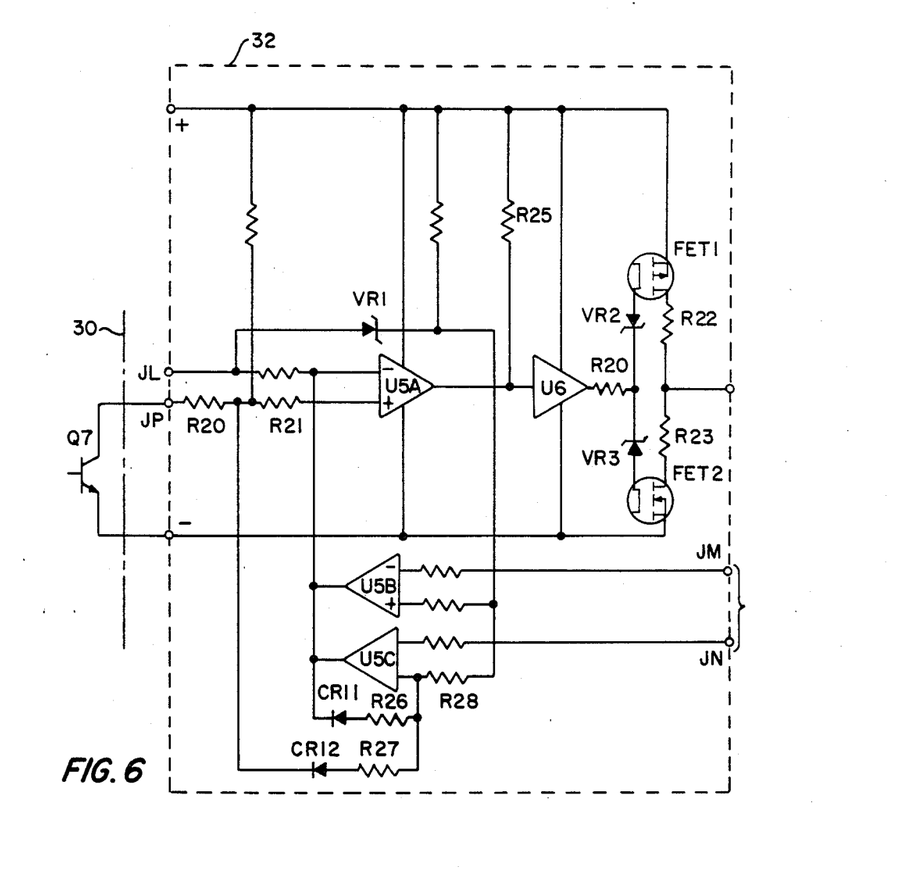
FIG. 6 shows one of the power transistor driver circuits.

Referring now to FIG. 6 there is shown a power transistor driver circuit 32. Power transistor driver circuit provides the output signal for switching the output power transistors Q1, Q2 on and off to provide the desired output. The driver circuit includes fast switching field effect transistors FET1, FET2 and protection circuits.

When the upper isolator circuit 30 is switched on it provides an isolated drive for its output transistor Q7. When transistor Q7 is turned on the positive input to voltage comparator U5A, through resistors R20 and R21, swings from a positive to a negative voltage. This causes voltage comparator U5A to turn on and its output becomes a negative voltage turning on the noninverting driver amplifier U6. Driver U6 is a high speed component capable of driving the input capacitance of transistors FET1 and FET2 off; reducing to a minimum the switching time of the bipolar output power transistor Q1. U5A reverses when upper isolator 30 is switched off and transistor FET1 turns off and transistor FET2 turns on.

Inputs JM and JN provide overvoltage and overcurrent protection respectively. A voltage divider network is connected across the collector to emitter of transistor Q1 to provide a sensed voltage signal which is compared to a reference voltage. If the sensed voltage exceeds the preset safe value the voltage protection circuit will turn off the base drive to transistor Q1. A current transformer senses the load current through the bipolar transistor Q1 and provides a rectified sensed voltage, proportional to load current, which is compared to a set reference voltage based on maximum current. When the current protection sensed voltage, which is proportional to current, exceeds the set voltage, the base drive to transistor Q1 is turned off. Overvoltage turns on comparator U5B and overcurrent turns on comparator U5C, either of which turn off comparator U5A. The input to U6 is then made positive through resistor R25 and amplifier U6 drives positive the gates, turning on N channel in transistor FET2. This action circulates current in the reverse base emitter region of power transistor Q1, turning off and protecting power transistor Q1.

Under normal conditions U5B and U5C are at ground potential. Every time the isolator switch output transistor Q7 switches on U5A logic input becomes low, driving on U5A, circulating current across resistor R25 through the open collector of U5A. The circulating current makes low the input and output of noninverting driver U6, turning on the P channel transistor FET1 and turning off the N channel transistor FET2. Transistor FET1 circulates current in the forward direction across the base to emitter of transistor Q1 turning it on. When isolator transistor Q7 turns off, transistor FET1 is turned off and FET2 is turned on, turning off the power output switching transistor Q1.

Diodes CR11, CR12 and resistors R26, R27, R28 are part of the protection circuit. When U5B or U5C output becomes negative, current circulates across R26, R28 and CR11 latching U5B or U5C until a new logic input pulse at input JP resets the protection. This circuit, once an overvoltage or overcurrent condition occurs, prevents the transistor Q1 from becoming active again within the cycle, allowing the unwanted condition to disappear. The protection circuit then becomes active during the next cycle.

Resistor R20 and Zener diodes VR2 and VR3 limit the current to FET1 and FET2 field effect gate to source capacitance and delay turn on or turn off. The delay is related to the time it takes to reach the conduction voltage of the low voltage Zener diodes VR2 and VR3. This very short delay avoids the short circuiting condition during driver commutation when driver current switches from one direction to the opposite direction. Resistors R22 and R23 limit base circuit.

The connection of transistors FET1 and FET2 as shown in FIG. 6 allows one to have a drive on voltage equal to the positive driver voltage plus the negative swing of the U6 driver output, which puts the field effect transistors FET1, FET2 well into the saturation region. The driver off voltage is developed in the same way but with reference to the negative driver voltage supply.

Figure 7:
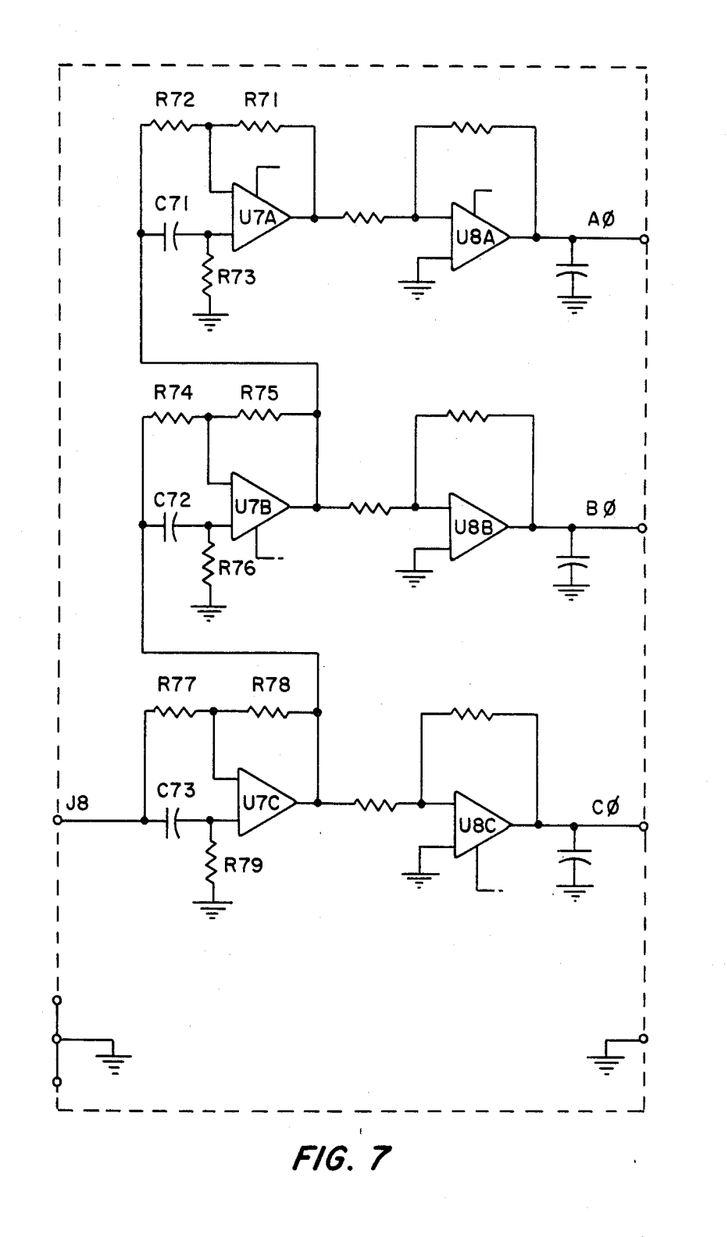
FIG. 7 shows the analog phase shift circuit for phase shifting the oscillator reference signal.

Referring now to FIG. 7 there is shown a analog phase shift circuit which is used when a three phase output is required. The phase shifter circuit of FIG. 7 provides three reference signals which are separated by 120° to provide the desired three phase output.

The circuit of FIG. 7 comprises a constant amplitude phase shifter which produces an output voltage equal in magnitude to the input signal but shifted in phase 120°. The reference sinusoidal input at J8 is connected to the phase shift circuit formed by capacitor C73 and resistor R79. The phase shift angle is $\phi = 2 \tan^{-1}/(W\ C73\ R79)$ The attenuated input is connected to the operational amplifier U7C to compensate for the voltage drop across the RC shifter and maintain the same output volts to feed from one phase to the next. Resistors R77 and R78 are equal in value.

The operational amplifier U8C is a buffer stage and also provides the voltage gain required by the band limit detector circuit to C phase. As the reference oscillator 22 provides 50 Hz, 60 Hz or 400 Hz the resistors R73, R76 and R79 must be adjusted accordingly to provide the required 120° phase shift, phase to phase.

Refer now to FIG. 8 there is shown a voltage supply circuit 58 for providing input power to the positive bus 12 and negative bus 14. Three phase generator coils 60, 62 are energized from the direct driven generator to provide three phase power outputs. The three phase power outputs through full wave bridge rectifier circuits 61, 63 are converted to positive and negative DC outputs. The positive bus 12, negative bus 14, and neutral bus 13 are connected to the load through the power output transistors Q1 and Q2 to provide the desired output wave. Various other voltages as required for control or regulation can be provided by supply 58 in a well known manner.

I claim:

1. A power supply for supplying a load comprising:
   an oscillator providing a reference signal having the desired output waveshape and frequency;
   a band limit generator providing a band defined between a first high limit reference signal, being more positive but having the same wave shape as the oscillator signal, and a second low limit reference signal, being more negative but having the same wave shape as the oscillator signal;
   a positive voltage source;
   a negative voltage source;
   a switching power stage connecting said positive voltage source or said negative voltage source to the load in response to a control signal;
   feedback circuit means for deriving a voltage feedback signal from the load;
   a detector for comparing the feedback signal to said upper limit reference signal and said lower limit reference signal to provide an output which is utilized to bring the feedback signal within the defined band; and
   power output control means for controlling said power output stage in response to the signal from said detector to bring the feeback signals within the defined band.

2. A power supply as claimed in claim 1 wherein:
   said switching power stage comprises a first transistor switch for connecting said positive voltage source to the load and a second transistor switch for connecting said negative voltage source to the load; and
   said detector provides a first signal for turning on the first transistor switch and a second signal for turning on the second transistor switch; and,
   interlock means in said detector for preventing said detector from simultaneously providing the first signal and the second signal.

3. A power supply as claimed in claim 1 comprising:
   phase shift means for phase shifting the output signal from said reference oscillator to provide multi phase output signals; and
   a switching power stage, feedback circuit means, a detector and power output control means for each phase.

4. A power supply for supplying a load comprising a reference oscillator providing a reference signal;
   a band limit generator providing a high limit reference signal of the same shape and frequency as the reference signal but having a more positive bias and a low limit reference signal of the same shape and frequency as the high limit reference signal but having a more negative bias;
   a positive voltage source;
   a negative voltage source;
   a switching power stage connecting said positive voltage source or said negative voltage source to the load in response to control signals;
   power output control means for providing the control signal to said switching power stage;
   a feedback circuit for providing a feedback signal from the load;
   a detector for comparing the feedback signal to the high limit reference signal and the low limit reference signal and providing an output when the feedback signal is more positive than the high limit reference signal or more negative than the low limit reference signal to cause the feedback signal to be brought within the band defined by the high limit reference signal and the low limit reference signal.

5. A power supply as claimed in claim 4 comprising:
   interlock means for preventing said positive voltage source and said negative voltage source being simultaneously connected to the load.

6. A power supply as claimed in claim 5 comprising:
   phase shift means connected to receive said reference signals for providing phase shifted signals for multi phases;
   additional switching power stages, one for each additional phase;
   additional feedback circuit, one for each additional phase; and
   additional detectors, one for each additional phase.

* * * * *